United States Patent
Sato et al.

(10) Patent No.: US 8,032,026 B2
(45) Date of Patent: Oct. 4, 2011

(54) OPTICAL TRANSMISSION APPARATUS, OPTICAL INTERFACE DEVICE, AND OPTICAL TRANSMISSION METHOD

(75) Inventors: Tomoko Sato, Kawasaki (JP); Sunao Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/320,074

(22) Filed: Jan. 15, 2009

(65) Prior Publication Data
US 2009/0297150 A1    Dec. 3, 2009

(30) Foreign Application Priority Data

May 27, 2008  (JP) .................................. 2008-138570

(51) Int. Cl.
*H04J 14/02*  (2006.01)
(52) U.S. Cl. ............. 398/79; 398/135; 398/116; 398/68
(58) Field of Classification Search ................. 398/79, 398/135, 116, 68
See application file for complete search history.

(56) References Cited

U.S. PATENT DOCUMENTS
2008/0232798 A1* 9/2008 Kasezawa ................. 398/34

FOREIGN PATENT DOCUMENTS
JP    06-152535    5/1994

OTHER PUBLICATIONS

SFF Committee "10 Gigabit Small Form Factor Pluggable Module" Revision 4.5, Aug. 31, 2005 (URL:http://www.xfpmsa.org/XFP_Rev4_5_SFF_INF_8077i.pdf).

* cited by examiner

*Primary Examiner* — Kinam Park
(74) *Attorney, Agent, or Firm* — Staas & Halsey LLP

(57) ABSTRACT

When an XFP is plugged into an optical interface unit by live-line plugging, an external bias voltage higher than an internal bias voltage is kept applied to a CDR incorporated in the optical interface unit until the XFP starts up. This prevents exertion of a negative effect on the CDR.

8 Claims, 9 Drawing Sheets

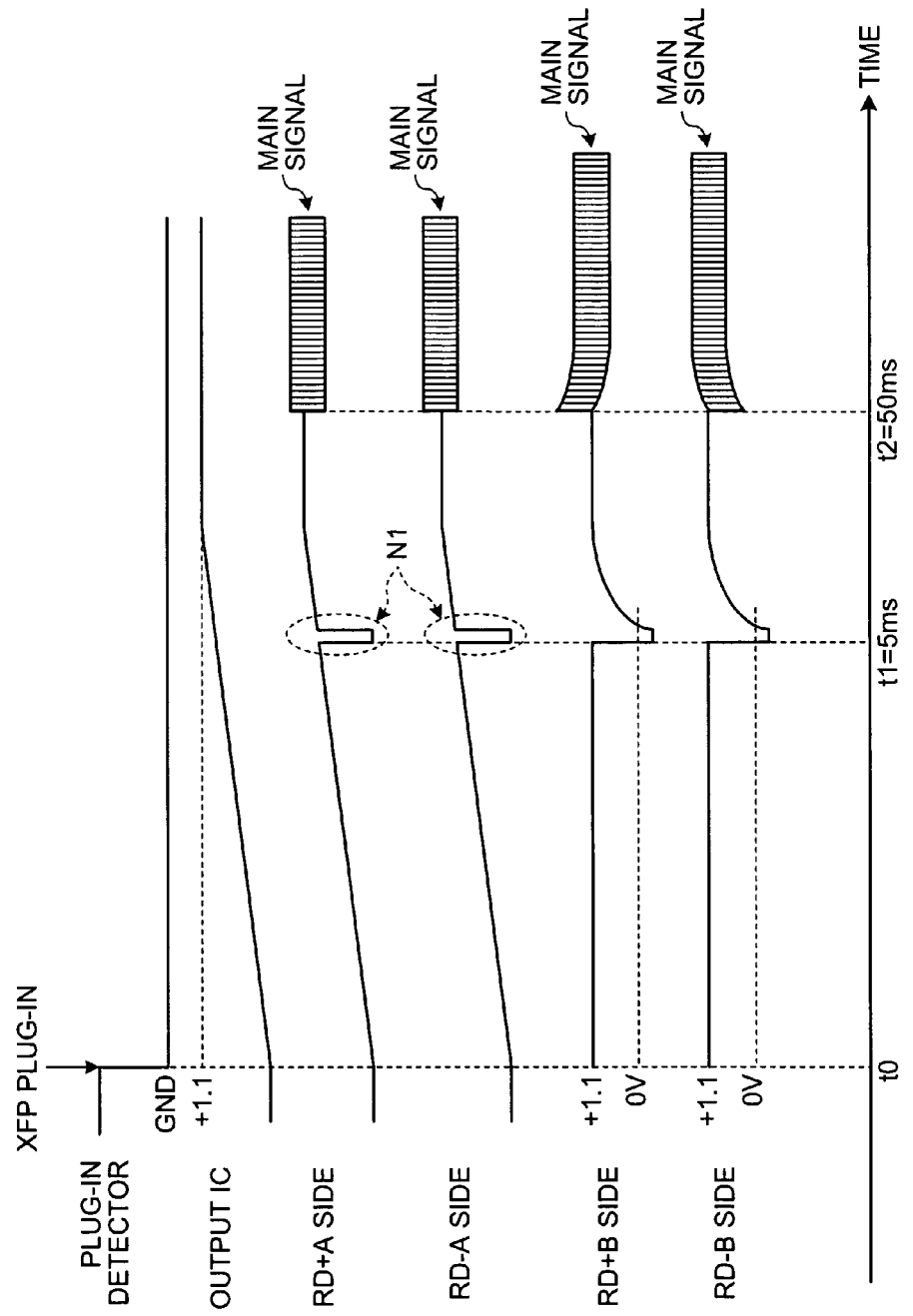

OPTICAL TRANSMISSION APPARATUS, OPTICAL INTERFACE DEVICE, AND OPTICAL TRANSMISSION METHOD

CROSS-REFERENCE TO RELATED APPLICATIONS

This application is based upon and claims the benefit of priority of the prior Japanese Patent Application No. 2008-138570, filed on May 27, 2008, the entire contents of which are incorporated herein by reference.

BACKGROUND

1. Field

The present invention relates to an optical transmission apparatus, an optical interface device, and an optical transmission method.

2. Description of the Related Art

In recent years, an optical wavelength division multiplex (WDM) system is often used for an optical communication network. In the optical wavelength division multiplex system, a plurality of optical signals of different wavelengths are multiplexed and transmitted through one optical fiber cable. The optical wavelength division multiplex system includes a plurality of optical wavelength division multiplex apparatuses that are connected via an optical fiber cable.

A certain type of optical wavelength division multiplex apparatus is compatible with a pluggable type (plug-in/pull-out type) optical device (hereinafter "pluggable optical device"). A pluggable optical device is a device that mainly carries out a process of converting an optical signal input from a client line into an electric signal and of converting an electric signal into an optical signal to output the optical signal to a client line. For example, an XFP (10 Gbit/s Small Form factor Pluggable) ("10 Gigabit Small Form factor Pluggable Module", [online], [searched on Apr. 21, 2008], Internet <URL: http://www.xfpmsa.org//FPF_Rev4_5_SFF_INF_8077i.pdf>) and an SFP (Small Form Factor Pluggable) are known as pluggable optical devices. When an optical wavelength division multiplex apparatus compatible with a pluggable optical device is used, the pluggable optical device can be plugged in or pulled out on a live line even if the optical wavelength division multiplex apparatus is still in the course of startup. This allows communication businesses and network administrators to deal flexibly with a change in a transmission distance or the wavelength of an optical signal.

The above optical wavelength division multiplex apparatus, however, poses the problem that live-line plug-in of the pluggable optical device may exert a negative effect on an IC (Integrated Circuit) in the optical wavelength division multiplex apparatus. Specifically, when the pluggable optical device is plugged into the optical wavelength division multiplex apparatus by live-line plugging, a noise may be generated on a voltage applied to a CDR (Clock Data Recovery) in the optical wavelength division multiplex apparatus before the startup of the pluggable optical device. The generation of such a noise may push the applied voltage out of the range of an input rated voltage for the CDR, thus causing a concern for a negative effect on the CDR.

SUMMARY

It is an object of the present invention to at least partially solve the problems in the conventional technology.

According to an aspect of an embodiment, an optical transmission apparatus includes a connector into which an optical device transmitting and receiving an optical signal is plugged; and an optical interface device that receives an optical signal via the optical device plugged in the connector. The optical interface device includes a clock data recovery circuit that generates a clock signal for operating the optical interface device; an internal bias voltage applying unit that applies a given voltage to the clock data recovery circuit; a plug-in detector that when the optical device is plugged into the connector by live-line plugging, detects live-line plug-in of the optical device; and an external bias voltage applying unit that when the plug-in detector detects live-line plug-in of the optical device, applies a voltage higher than a voltage applied by the internal bias voltage applying unit, to the clock data recovery circuit.

According to another aspect of an embodiment, an optical interface device is provided with an optical transmission apparatus for transmitting an input optical signal from an external device to another device. The optical interface device includes a connector into which an optical device transmitting and receiving an optical signal to and from the external device is plugged; a clock data recovery circuit that generates a clock signal for operating the optical interface device; an internal bias voltage applying unit that applies a given voltage to the clock data recovery circuit; a plug-in detector that when the optical device is plugged into the connector by live-line plugging, detects live-line plug-in of the optical device; and an external bias voltage applying unit that when the plug-in detector detects live-line plug-in of the optical device, applies a voltage higher than a voltage applied by the internal bias voltage applying unit, to the clock data recovery circuit.

According to still another aspect of an embodiment, an optical transmission method is for an optical transmission apparatus that includes a connector into which an optical device transmitting and receiving an optical signal is plugged, and an optical that transmits the optical signal received by the optical device to another device. The optical transmission method includes applying a given voltage to a clock data recovery circuit that generates a clock signal for operating the optical interface device; when the optical device is plugged into the connector by live-line plugging, detecting live-line plug-in of the optical device; and when the plug-in detector detects live-line plug-in of the optical device, applying a voltage higher than the given voltage to the clock data recovery circuit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 9 is a time chart of the values of voltages applied to circuits of FIG. 8.

DETAILED DESCRIPTION OF THE PREFERRED EMBODIMENTS

Embodiments of an optical transmission apparatus, an optical interface device, and an optical transmission method disclosed in the present invention will now be described in detail based on the accompanying drawings. Hereinafter, description will be made of examples in which the optical transmission apparatus, the optical interface device, and the optical transmission method disclosed in the present invention are applied to an optical wavelength division multiplex apparatus. The optical transmission apparatus, the optical interface device, and the optical transmission method disclosed in the present invention, however, may be applied to an optical transmission apparatus other than the optical wavelength division multiplex apparatus.

Figure 7:
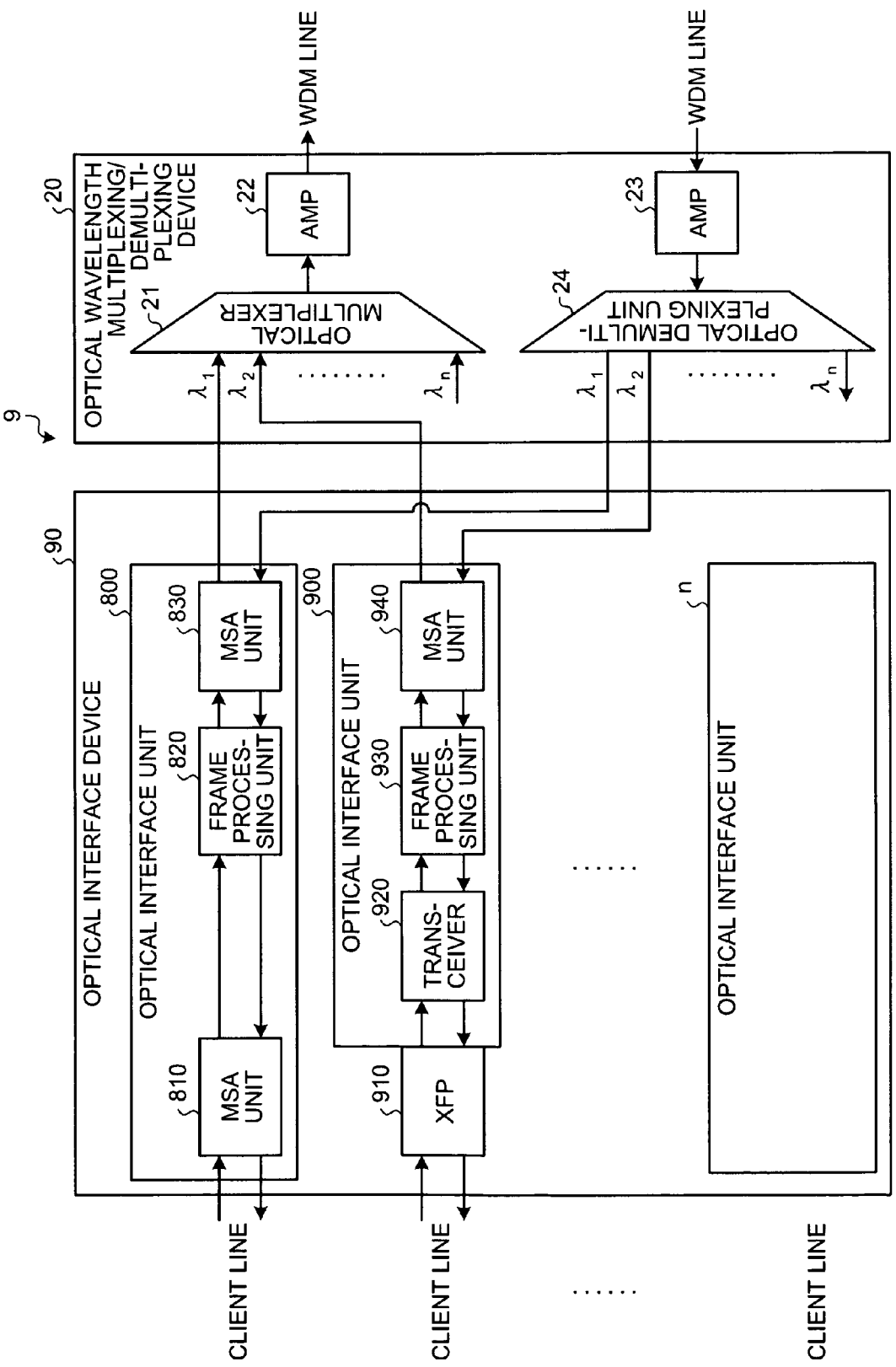
FIG. 7 is a configuration diagram of a conventional optical wavelength division multiplex apparatus.

A configuration of a conventional optical wavelength division multiplex apparatus will first be described to clarify the features of an optical wavelength division multiplex apparatus of a first embodiment. FIG. 7 is a configuration diagram of a conventional optical wavelength division multiplex apparatus 9. As shown in FIG. 7, the optical wavelength division multiplex apparatus 9 includes an optical interface device 90, and an optical wavelength multiplexing/demultiplexing device 20.

The optical interface device 90 has a plurality of optical interface units 800, 900, . . . , n, as shown in FIG. 7. The optical interface unit 800 is an optical interface unit that is not compatible with a pluggable optical device, and has an MSA (Multisource Agreement) unit 810, a frame processing unit 820, and an MSA unit 830.

The MSA unit 810 converts an optical signal input from a client line into an electric signal to output the electric signal to the frame processing unit 820, and converts an electric signal input from the frame processing unit 820 into an optical signal to transmits the optical signal to the client line.

The frame processing unit 820, when receiving input of an electric signal from the MSA unit 810, carries out overhead processes including a process of dividing data into fixed length segments to rearrange the data into a frame structure with control information added thereto and a process of removing a frame from data arranged into a frame structure. When receiving input of an electric signal from the MSA unit 830, the frame processing unit 820 removes a frame from the electric signal data to output the unframed electric signal to the MSA unit 810.

The MSA unit 830, when receiving input of an electric signal from the frame processing unit 820, converts the input electric signal into an optical signal of a narrow band wavelength of λ1 to output the optical signal to an optical multiplexer 21, which will be described later. When receiving input of an optical signal of the narrow band wavelength of λ1 from an optical demultiplexer 24, which will be described later, the MSA unit 830 converts the input optical signal into an electric signal to output the electric signal to the frame processing unit 820.

The optical interface unit 900 is an optical interface unit that is compatible with a pluggable optical device, and has a transceiver 920, a frame processing unit 930, and an MSA unit 940. In FIG. 7, an XFP 910 is plugged in the optical interface unit 900.

The XFP 910 is a pluggable optical device that can be plugged in and pulled out of the optical interface unit 900, and converts an optical signal into an electric signal and an electric signal into an optical signal as well. Specifically, when receiving input of an optical signal from a client line, the XFP 910 converts the input optical signal into an electric signal to output the electric signal to the transceiver 920. When receiving input of an electric signal from the transceiver 920, the XFP 910 converts the input electric signal into an optical signal to transmit the optical signal to the client line.

The transceiver 920 has a CDR circuit, a SERDES (Serializer/Deserializer) circuit, etc. When receiving input of an electric signal from the XFP 910 or the frame processing unit 930, the transceiver 920 carries out a process of generating a clock signal for operating the optical interface unit 900, based on the electric signal having a waveform characteristic thereof.

The frame processing unit 930, similar to the above frame processing unit 820, carries out a prescribed overhead process. The MSA unit 940, when receiving input of an electric signal from the frame processing unit 930, converts the input electric signal into an optical signal of a narrow band wavelength of λ2 to output the optical signal to the optical multiplexer 21, which will be described later. When receiving input of an optical signal of the narrow band wavelength of λ2 from the optical demultiplexer 24, which will be described later, the MSA unit 940 converts the input optical signal into an electric signal to output the electric signal to the frame processing unit 930.

The optical wavelength multiplexing/demultiplexing device 20 is the device that multiplexes and demultiplexes an optical signal, and has the optical multiplexer 21, an amplifier 22, an amplifier 23, and the optical demultiplexer 24. The optical multiplexer 21 multiplexes optical signals of wavelengths of λ1 to λn input from the optical interface units 800, 900, . . . , n, and outputs the multiplexed optical signal to the amplifier 22. The amplifier 22 amplifies the optical signal input from the optical multiplexer 21 to transmit the amplified optical signal to a WDM line (optical fiber cable).

The amplifier 23 amplifies an optical signal input from a WDM line to output the amplified optical signal to the optical demultiplexer 24. The optical demultiplexer 24 demultiplexes the optical signal input from the amplifier 23 into optical signals of wavelengths of λ1 to λn, and outputs the demultiplexed optical signals to the optical interface units 800, 900, . . . , n.

Figure 8:
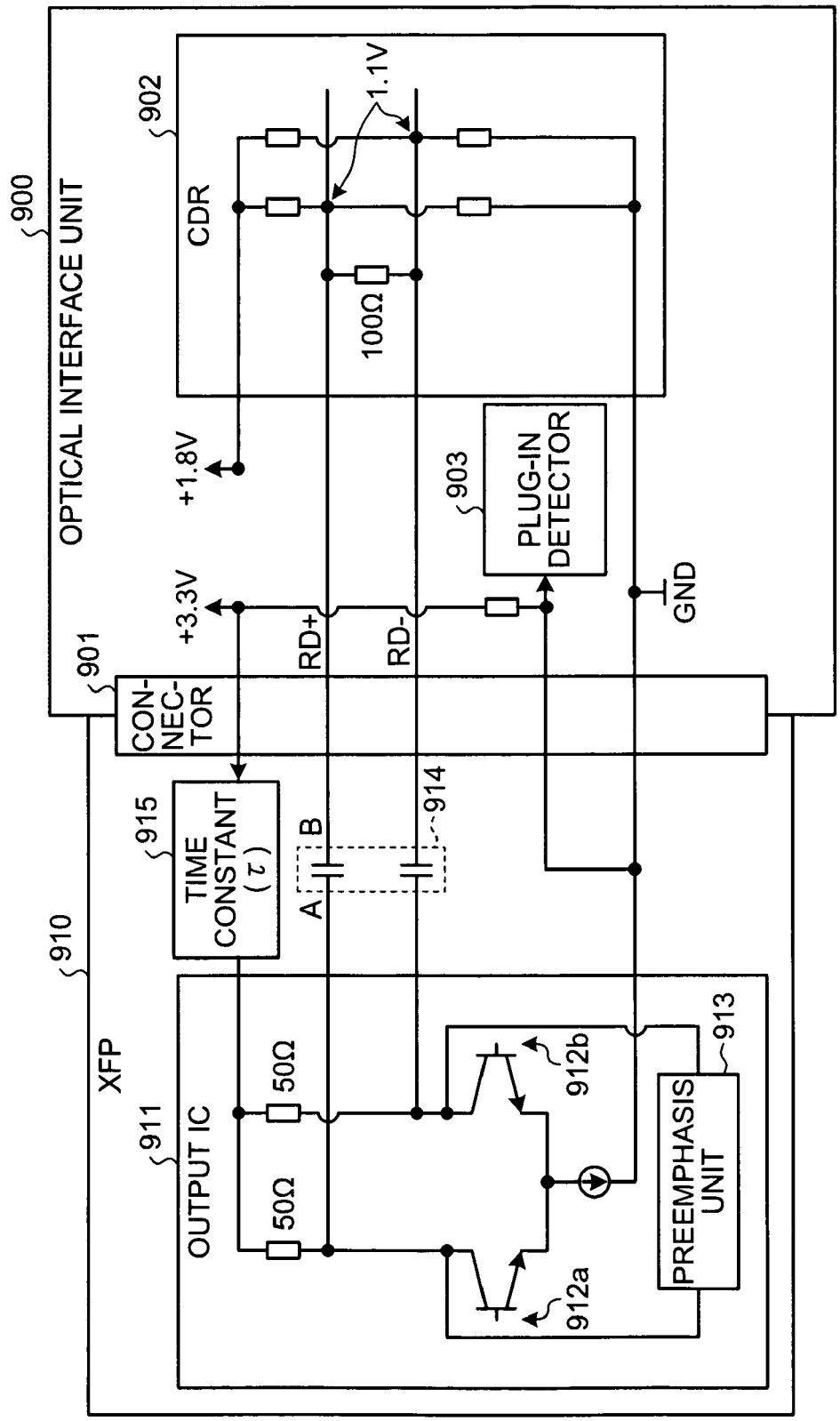
FIG. 8 is an example of a schematic circuit diagram of the optical interface unit of FIG. 7.

A circuit configuration of the optical interface unit 900 of FIG. 7 will then be described. FIG. 8 is an example of a schematic circuit diagram of the optical interface unit 900 of FIG. 7. The optical interface unit 900 of FIG. 8 is compatible with a pluggable optical device, so that the XFP 910 is plugged in a connector 901. FIG. 8 shows only the output circuit that outputs an electric signal among circuits in the circuit configuration of the XFP 910, and shows only the receiving circuit that receives an electric signal among circuits in the circuit configuration of the CDR 902.

The XFP 910 has an output IC 911, AC (Alternating Current) coupling capacitors 914, and an RC (Resistance/Capacitor) circuit 915. When an electric signal converted from an optical signal through a given circuit (not shown) is input to the output IC 911, the output IC 911 amplifies the electric signal to output the amplified electric signal to the AC coupling capacitors 914. Specifically, at the output IC 911, an electric signal is input to the bases of transistors 912*a* and 912*b*, and is amplified in amplitude by a preemphasis unit 913, and then is output to the AC coupling capacitors 914. The AC coupling capacitors 914 eliminate a DC (Direct Current) component from the electric signal input from the output IC 911 to generate main signals RD+ and RD− and output the main signals RD+ and RD− to the optical interface unit 900.

The RC circuit 915 is formed of a resistance and a capacitor. When the XFP 910 is plugged into the optical interface unit 900 by live-line plugging, the RC circuit 915 gradually increases a voltage applied to the output IC 911 to prevent a flow of inrush current. In the case of FIG. 8, the time constant of the RC circuit 915 is defined as a time constant ($\tau$).

The optical interface unit 900 has the connector 901, a CDR 902, and a plug-in detector 903. The connector 901 is the connector in which a pluggable optical device, such as the XFP 910, is plugged. The CDR 902 generates a clock signal for operating the optical interface unit 900, based on an electric signal input from the output IC 911. To the CDR 902, a given voltage (hereinafter "internal bias voltage") is applied by a voltage source (not shown). In the case of FIG. 8, the internal voltage of 1.1 [V (volt)] is applied to the CDR 902.

The plug-in detector 903 is the processing unit that detects live-line plug-in of the XFP 910. Specifically, when the XFP 910 is plugged in by live-line plugging, the plug-in detector 903 detects the plug-in of the XFP 910 based on a fact that a voltage applied to the plug-in detector 903 turns out a ground voltage.

In the above configuration, when the XFP 910 is plugged into the optical interface unit 900 by live-line plugging, a voltage lower than an input rated voltage is applied to the CDR 902 to bring the problem that a negative effect may be exerted on the CDR 902. Such a problem will be described specifically referring to FIG. 9.

FIG. 9 is a time chart of the values of voltages applied to circuits of FIG. 8. In increasing order, the time chart of FIG. 9 shows the value of a voltage applied to the plug-in detector 903, the value of a voltage applied to the output IC 911, the value of a voltage applied to the A side of the AC coupling capacitor 914 that outputs the main signal RD+, the value of a voltage applied to the A side of the AC coupling capacitor 914 that outputs the main signal RD−, the value of a voltage applied to the B side of the AC coupling capacitor 914 that outputs the main signal RD+, and the value of a voltage applied to the B side of the AC coupling capacitor 914 that outputs the main signal RD−.

As shown in FIG. 9, when the XFP 910 is plugged into the optical interface unit 900 by live-line plugging, the voltage applied to the plug-in detector 903 turns out the ground voltage. The voltage applied to the output IC 911 increases gradually after plug-in of the XFP 910 to reach 1.1 [V] because of the work of the RC circuit 915, as described above. In the case of FIG. 9, at the XFP 910, application of the voltage 1.1 [V] settles the operation of the IC in the XFP 910 at the point that a time t2=50 [ms] has passed after live-line plug-in of the XFP 910 into the optical interface unit 900, which causes the XFP 910 to start a process of outputting the main signals RD+ and RD−. In the present specification, a period during which the XFP 910 is in the course of startup ranges from the live-line plugging of the XFP 910 into the optical interface unit 900 to the settlement of the operation of the IC in the XFP 910.

As shown in FIG. 9, the voltages applied to the A side of the AC coupling capacitors 914 that output the main signals RD+ and RD− increase gradually as the voltage applied to the output IC 911 does. A low level noise, however, may be generated on the voltages applied to the A sides of the AC coupling capacitors 914 during the startup of the XFP 910. In the case of FIG. 9, a noise N1 is generated when a time t1=5 [ms] has passed after live-line plug-in of the XFP 910 into the optical interface unit 900. Such a noise is generated because the operation of the preemphasis unit 913 becomes unstable during the startup of the XFP 910.

As shown in FIG. 9, the voltages applied to the B sides of the AC coupling capacitors 914 that output the main signals RD+ and RD− are the internal bias voltage of 1.1 [V]. The generation of the noise N1, however, leads to a drop in the voltages applied to the B sides of the AC coupling capacitors 914, which means a drop in the voltage applied to the CDR 902. As a result, the voltage that is applied to the CDR 902 at the time of generation of the noise N1 becomes lower than the input rated voltage for the CDR 902, which may exert a negative effect on the CDR 902. FIG. 9 shows the case where a voltage lower than 0 [V] is applied to the CDR 902 as a result of the generation of the noise N1.

The optical interface unit incorporated in an optical wavelength division multiplex apparatus 1 of the first embodiment keeps applying a voltage higher than the internal bias voltage to the CDR 902 until the XFP starts up when the XFP is plugged into the optical interface unit by live-line plugging. This allows the optical wavelength division multiplex apparatus 1 of the first embodiment to prevent application of a voltage lower than the input rated voltage to the CDR 902 even if a voltage applied to the CDR 902 drops during the startup of the XFP. The above matter will hereinafter be described reference to FIGS. 1 to 3.

Figure 1:
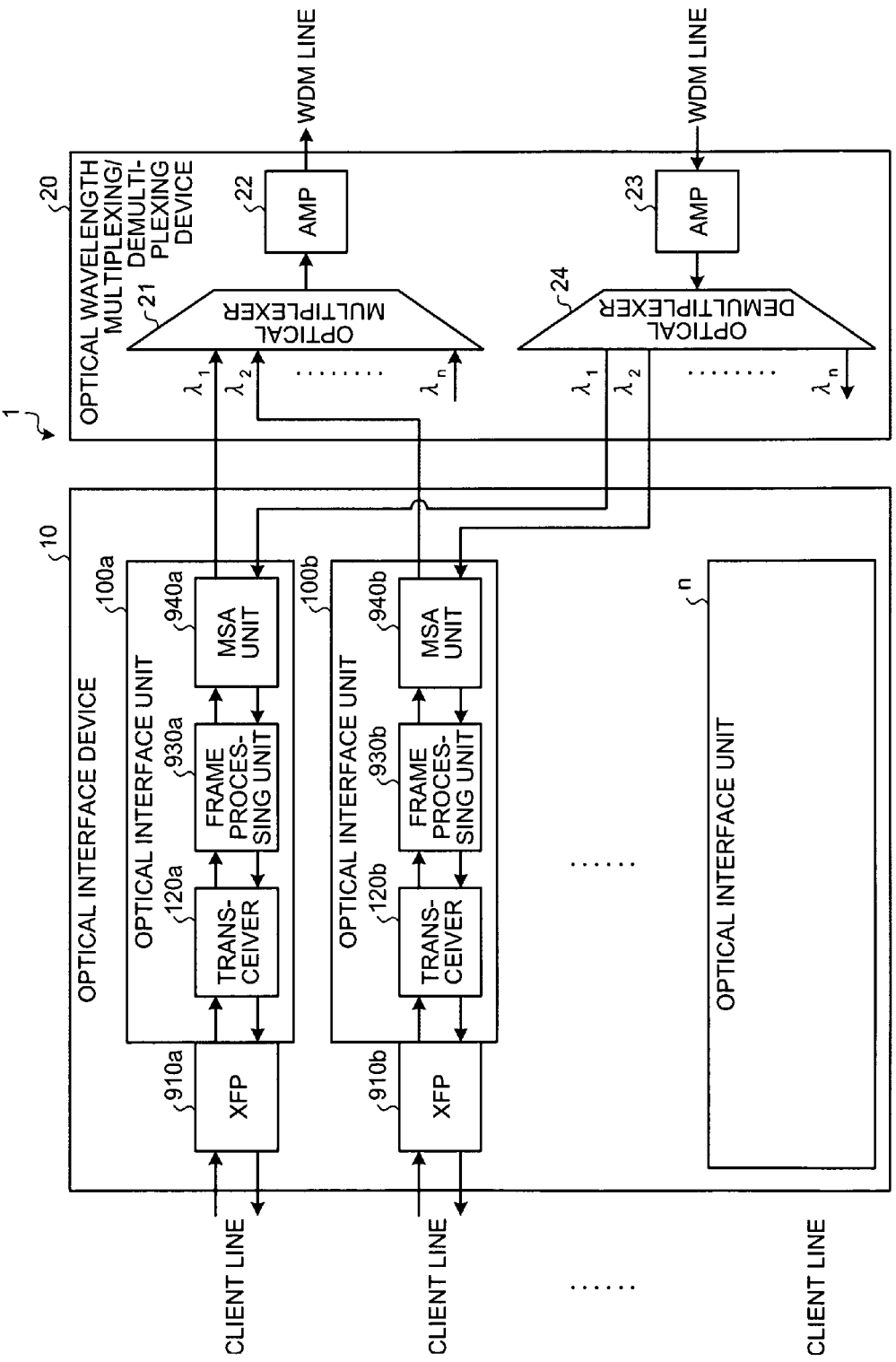
FIG. 1 is a configuration diagram of an optical wavelength division multiplex apparatus according to a first embodiment.

FIG. 1 is a configuration diagram of the optical wavelength division multiplex apparatus 1 according to the first embodiment. In the following description, the component units having the same functions as the component units of FIG. 7 will be denoted by the same reference numerals, and will be omitted in detailed description. As shown in FIG. 1, the optical wavelength division multiplex apparatus 1 includes an optical interface device 10, and the optical wavelength multiplexing/demultiplexing device 20.

The optical interface device 10 has optical interface units 100*a*, 100*b*, . . . , n. Because each of the optical interface units 100*a*, 100*b*, . . . , n has the same configuration, the optical interface unit 100*a* will be described as a specific example in the following description.

The optical interface unit 100*a* has an XFP 910*a*, a transceiver 120*a*, a frame processing unit 930*a*, and an MSA unit 940*a*. While the optical interface unit 100*a* has the XFP 910*a* in FIG. 1, the optical interface unit 100*a* may have a pluggable optical device other than the XFP 910*a*, such as an SFP.

The XFP 910*a* has the same function as that of the XFP 910 of FIG. 7. The transceiver 120*a*, similar to the transceiver 920 of FIG. 7, carries out the process of generating a clock signal, and when the XFP 910*a* is plugged in by live-line plugging, keeps applying a voltage higher than the internal bias voltage to the CDR 902 until the startup of the XFP 910*a*. A voltage application process by the transceiver 120*a* will be described in detail later.

The frame processing unit 930*a* has the same function as that of the frame processing unit 930 of FIG. 7, and the MSA unit 940*a* has the same function as that of the MSA unit 940 of FIG. 7. In FIG. 1, the optical wavelength division multiplex apparatus 1 includes the optical interface units 100*a*, 100*b*, . . . , n each compatible with a pluggable optical device.

The optical wavelength division multiplex apparatus 1, however, may include both optical interface unit compatible with a pluggable optical device and optical interface unit not compatible with the pluggable optical device.

Figure 2:
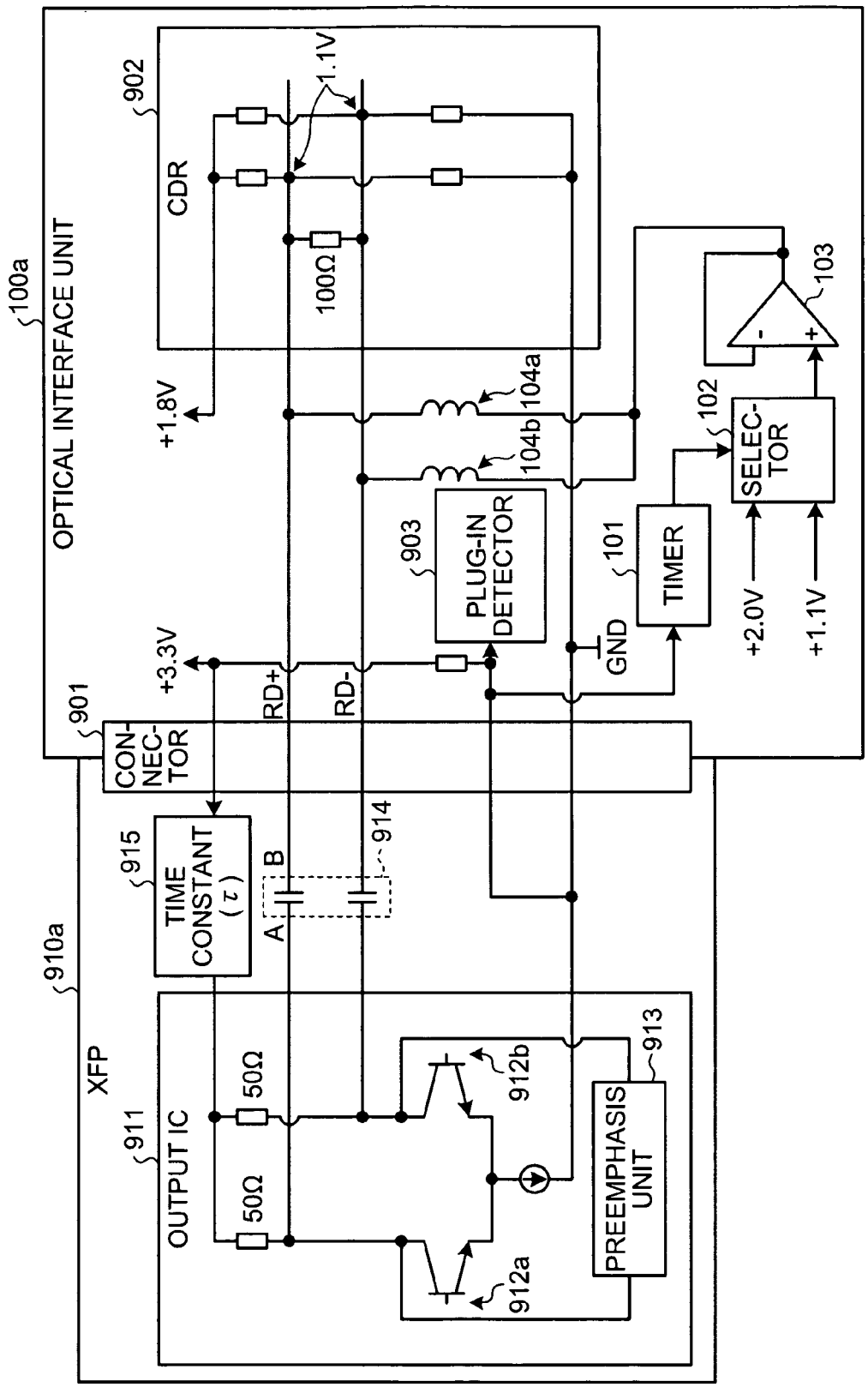
FIG. 2 is an example of a schematic circuit diagram of an optical interface unit incorporated in the optical wavelength division multiplex apparatus of FIG. 1.

A circuit configuration of the optical interface unit 100*a* of FIG. 1 will then be described. FIG. 2 is an example of a schematic circuit diagram of the optical interface unit 100*a* incorporated in the optical wavelength division multiplex apparatus 1 of FIG. 1. In the following description, the component units having the same functions as the component units of FIG. 8 will be denoted by the same reference numerals, and will be omitted in detailed description. A shown in FIG. 2, the optical interface unit 100*a* has a timer 101, a selector 102, an operational amplifier 103, and inductances 104*a* and 104*b*.

When the plug-in detector 903 detects live-line plug-in of the XFP 910*a*, the timer 101 counts a time having passed from the point of live-line plug-in of the XFP 910*a*, and outputs a live-line plug-in notice noticing of the live-line plug-in of the XFP 910*a* to the selector 102. When a given time has passed from the point of live-line plug-in of the XFP 910*a*, the timer 101 outputs a startup completion notice noticing of the passage of the given time to the selector 102. "Given time" represents a time that is slightly shorter than a time from the live-line plug-in of the XFP 910*a* to the settlement of operation of the IC in the XFP 910*a*.

The selector 102 is connected to a plurality of voltage sources (not shown), serving as a selector circuit that selects an output voltage, based on the live-line plug-in notice and the startup completion notice that are input from the timer 101. Specifically, when receiving input of the live-line plug-in notice from the timer 101, the selector 102 outputs a voltage higher than the internal bias voltage applied to the CDR 902. Alternatively, when receiving input of the live-line plug-in notice from the timer 101, the selector 102 outputs a voltage equal in potential to the internal bias voltage applied to the CDR 902.

In the case of FIG. 2, when receiving input of the live-line plug-in notice from the timer 101, the selector 102 outputs the voltage of 2.0 [V] that is higher than the internal bias voltage of 1.1 [V] applied to the CDR 902. Alternatively, when receiving input of the live-line plug-in notice from the timer 101, the selector 102 outputs a voltage of 1.1 [V] that is equal in potential to the internal bias voltage of 1.1 [V] applied to the CDR 902.

The operational amplifier 103 carries out impedance conversion to lower the impedance of the output voltage below the impedance of an input voltage from the selector 102. The output voltage from the operational amplifier 103 is applied to the CDR 902 via the inductances 104*a* and 104*b*. Hereinafter, a voltage applied to the CDR 902 via the operational amplifier 103 is referred to as "external bias voltage".

The inductances 104*a* and 104*b* are provided so that a circuit composed of the selector 102 and the operational amplifier 103 has high impedance. Specifically, in the circuit of FIG. 2 that handles a high frequency signal, the inductances 104*a* and 104*b* have high impedance against an ac signal. This prevents output of the main signals RD+ and RD− of high frequencies to the inductances 104*a* and 104*b*. As a result, the external bias voltage can be applied to the CDR 902 without giving any effect to the main signals RD+ and RD−.

Figure 3:
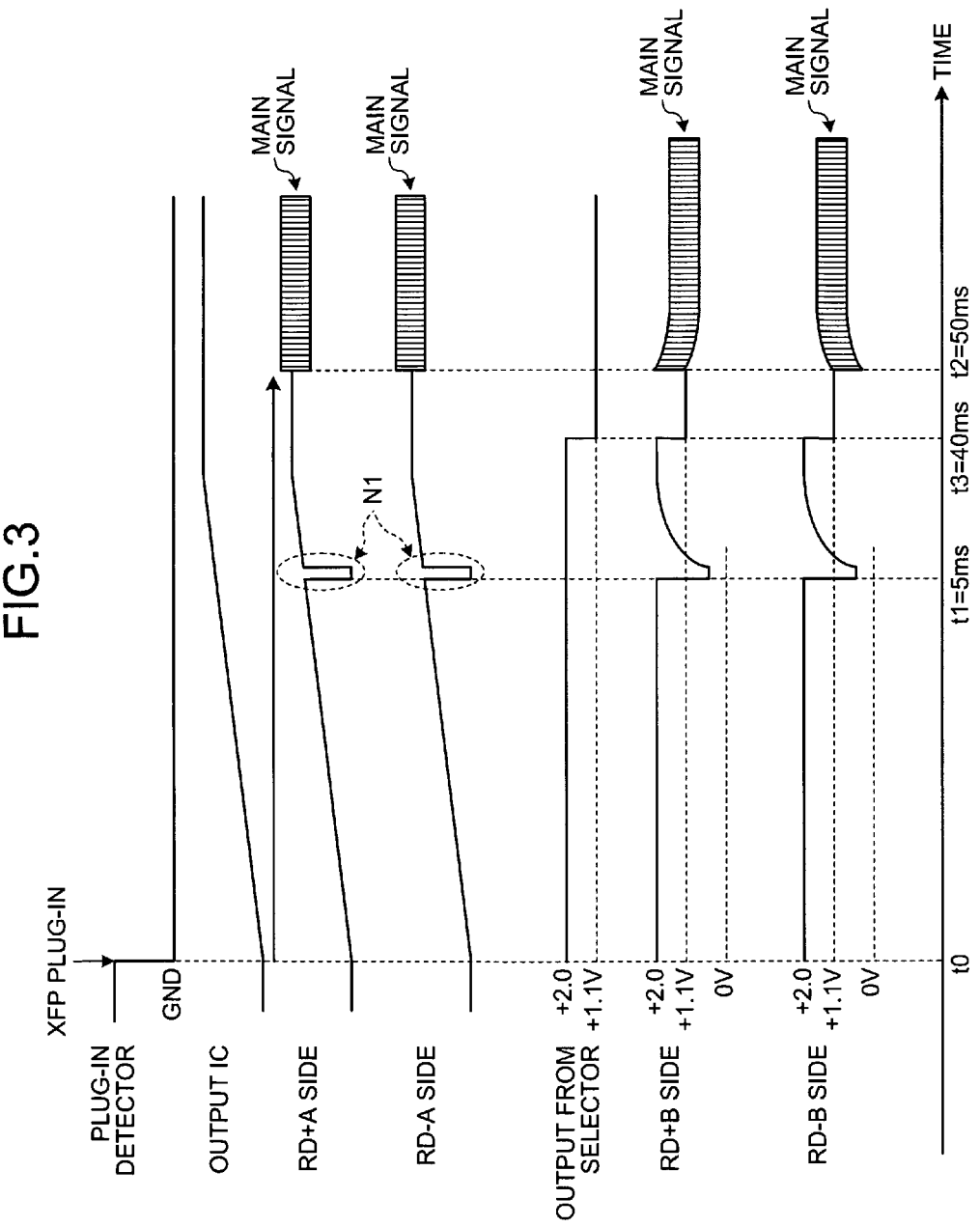
FIG. 3 is a time chart of the values of voltages applied to circuits of FIG. 2.

FIG. 3 is a time chart of the values of voltages applied to circuits of FIG. 2. In increasing order, the time chart of FIG. 3 shows the value of a voltage applied to the plug-in detector 903, the value of a voltage applied to the output IC 911, the value of a voltage applied to the A side of the AC coupling capacitor 914 that outputs the main signal RD+, the value of a voltage applied to the A side of the AC coupling capacitor 914 that outputs the main signal RD−, the value of a voltage output from the selector 102, the value of a voltage applied to the B side of the AC coupling capacitor 914 that outputs the main signal RD+, and the value of a voltage applied to the B side of the AC coupling capacitor 914 that outputs the main signal RD−.

As shown in FIG. 3, the selector 102 outputs the voltage of 2.0 [V] when the XFP 910*a* is plugged in by live-line plugging, and then outputs a voltage of 1.1 [V] after the passage of a given time. In the case of FIG. 3, the selector 102 keeps outputting the voltage of 2.0 [V] from the point of live-line plug-in of the XFP 910*a* to the point of passage of a time t3=40 [ms], and then outputs the voltage of 1.1 [V] after the passage of the time t3=40 [ms].

As shown in FIG. 3, voltages applied to the B side of the AC coupling capacitors 914 that output the main signals RD+ and RD− remain the external bias voltage of 2.0 [V] from the point of live-line plug-in of the XFP 910*a* to the point of passage of the time t3=40 [ms], and change to the external bias voltage of 1.1 [V] after the passage of the time t3=40 [ms].

During the startup of the XFP 910*a*, as shown in FIG. 3, the low level noise N1 may be generated on the voltages applied to the A side of the AC coupling capacitors 914 that output the main signals RD+ and RD−. The generation of the noise N1 leads to a drop in the voltages applied to the B side of the AC coupling capacitors 914. At this time, however, the voltage of 2.0 [V] is applied to the B side of the AC coupling capacitors 914. Because of this, even if a voltage allied to the CDR 902 drops consequently, the voltage allied to the CDR 902 never drops below the input rated voltage for the CDR 902. This prevents exertion of a negative effect on the CDR 902.

As shown in FIG. 3, the selector 102 brings the external bias voltage equal in potential to the internal bias voltage before the operation of the IC in the XFP 910*a* is settled. This prevents the voltage applied to the CDR 902 from becoming higher than the input rated voltage for the CDR 902.

Figure 4:
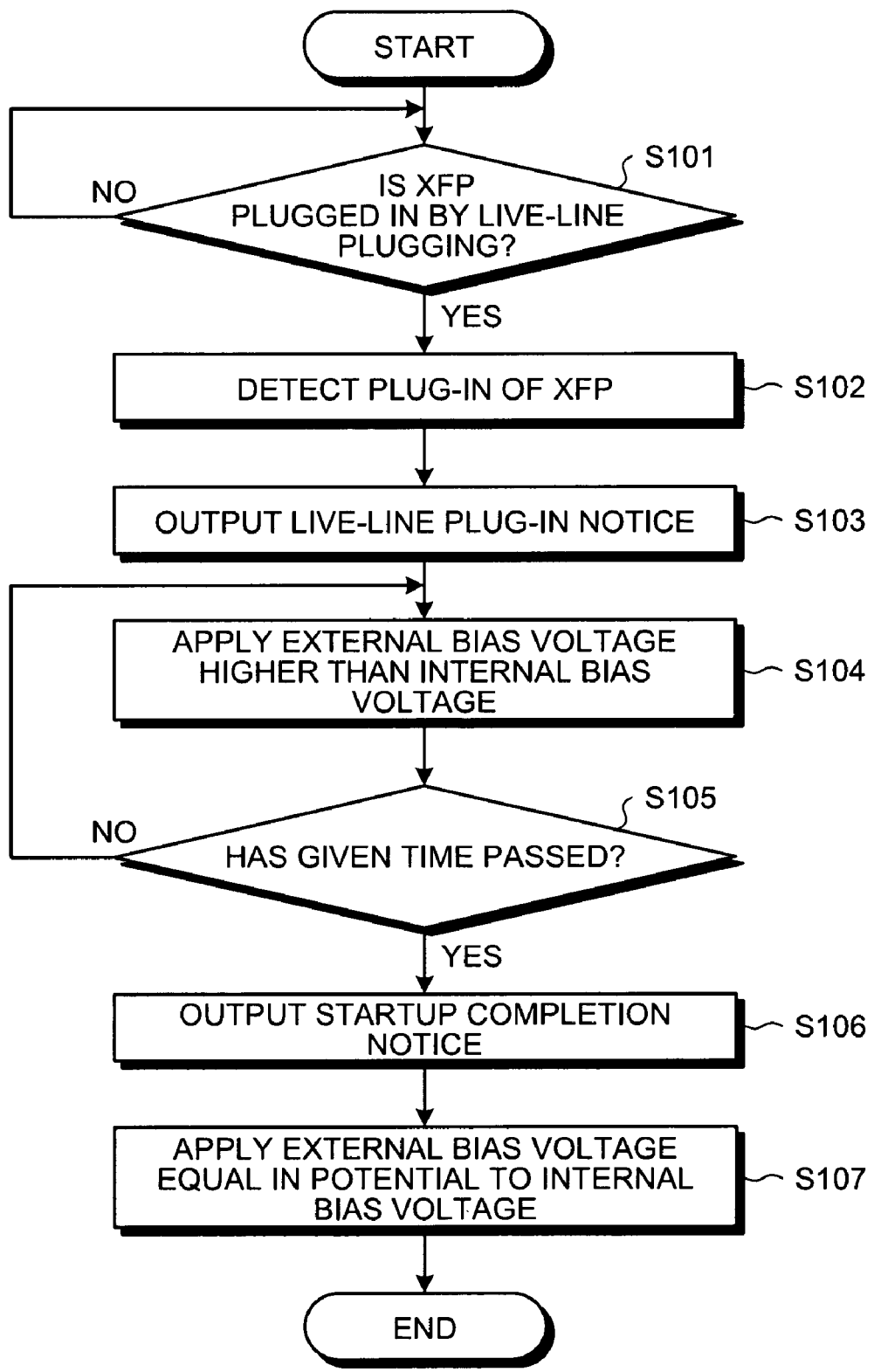
FIG. 4 is a flowchart of an external bias voltage applying procedure executed by the optical interface unit of FIG. 1.

An external bias voltage applying procedure by the optical interface unit 100*a* of FIG. 1 will then be described. FIG. 4 is a flowchart of the external bias voltage applying procedure executed by the optical interface unit 100*a* of FIG. 1. As shown in FIG. 4, when the XFP 910*a* is plugged in by live-line plugging (Yes at step S101), the plug-in detector 903 detects plug-in of the XFP 910*a* based on a fact that a voltage applied to the plug-in detector 903 turns out a ground voltage (step S102).

Subsequently, when the plug-in detector 903 detects the live-line plug-in of the XFP 910*a*, the timer 101 outputs the live-line plug-in notice noticing of the live-line plug-in of the XFP 910*a* to the selector 102 (step S103). Upon receiving input of the live-line plug-in notice, the selector 102 inputs the external bias voltage higher than the internal bias voltage applied to the CDR 902, to the CDR 902 via the operational amplifier 103 and the inductances 104*a* and 104*b* (step S104).

When a given time has passed from the live-line plug-in of the XFP 910*a* (Yes at step S105), the timer 101 outputs the startup completion notice to the selector 102 (step S106). Upon receiving input of the startup completion notice, the selector 102 inputs the external bias voltage equal in potential to the internal bias voltage applied to the CDR 902, to the CDR 902 via the operational amplifier 103 and the inductances 104*a* and 104*b* (step S107).

As described above, the optical wavelength division multiplex apparatus of the first embodiment is configured so that when the XFP 910*a* is plugged into the optical interface unit 100*a* by live-line plugging, the external bias voltage higher than the internal bias voltage is kept applied to the CDR 902 incorporated in the optical interface unit 100*a* until the XFP 910*a* starts up. This prevents application of a voltage lower than the input rated voltage to the CDR 902 during the startup of the XFP 910*a*. Hence the optical wavelength division multiplex apparatus 1 of the first embodiment prevents exertion of a negative effect on the CDR even if a pluggable optical device is plugged in by live-line plugging.

According to the optical wavelength division multiplex apparatus 1 of the first embodiment, the external bias voltage equal in potential to the internal bias voltage is applied to the CDR 902 when the given time has passed from the live-line plug-in of the XFP 910*a*. This prevents the voltage applied to the CDR 902 from becoming higher than the input rated voltage for the CDR 902.

In the first embodiment, a circuit including the selector 102, the operational amplifier 103, and the inductances 104*a* and 104*b* (hereinafter "external bias voltage applying circuit") is disposed at the front stage of the CDR 902 for application of the external bias voltage. A certain type of CDR, however, is provided with a pin for applying a bias voltage, and the external bias voltage applying circuit may be connected to such a pin. In a second embodiment, the external bias voltage applying circuit is connected to the pin for applying the bias voltage, which case will be described.

Figure 5:
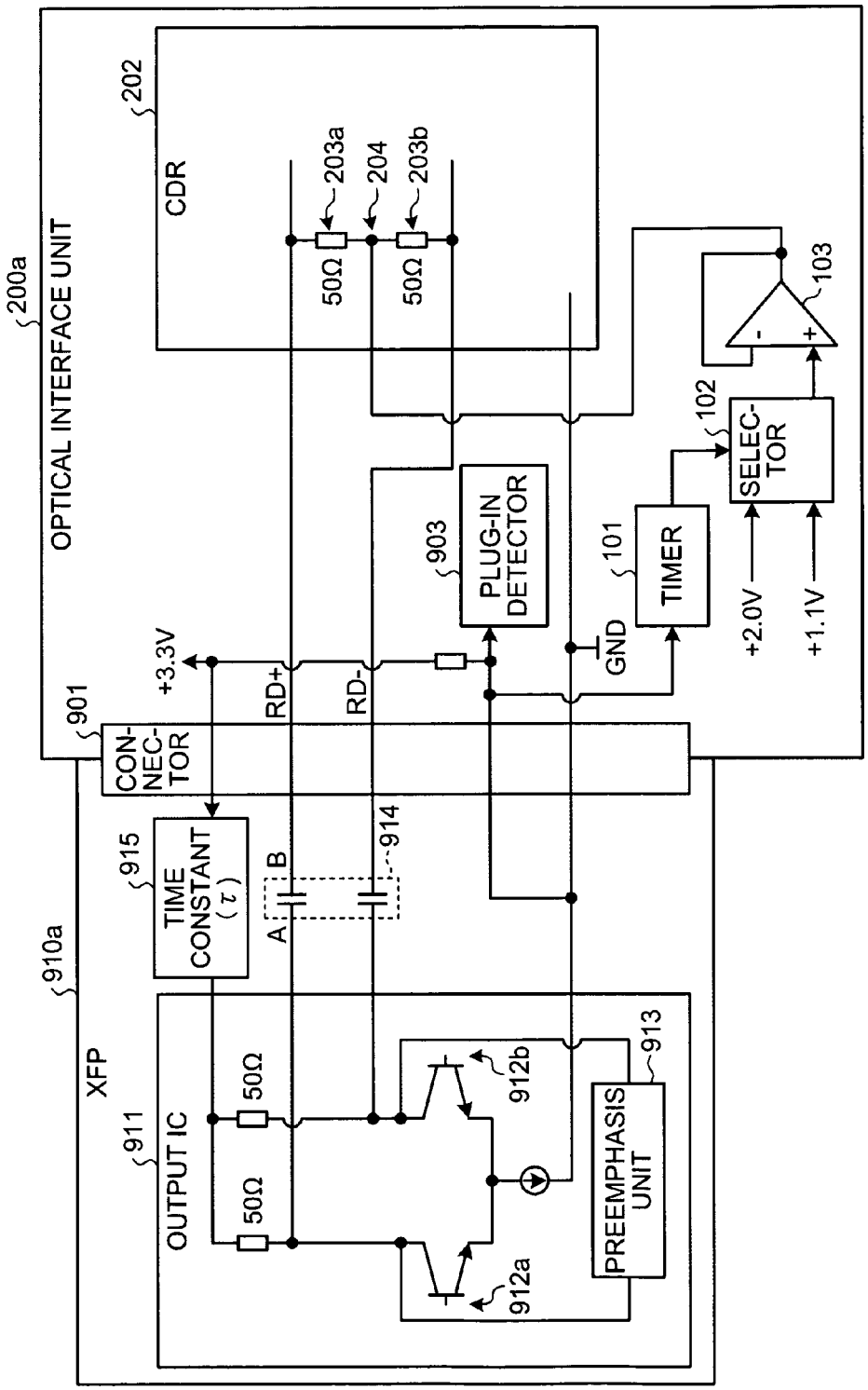
FIG. 5 is an example of a schematic circuit diagram of an optical interface unit incorporated in an optical wavelength division multiplex apparatus according to a second embodiment.

FIG. 5 is an example of a schematic circuit diagram of an optical interface unit 200*a* incorporated in an optical wavelength division multiplex apparatus 2 according to the second embodiment. In the following description, the component units having the same functions as the component units of FIG. 2 will be denoted by the same reference numerals, and will be omitted in detailed description.

As shown in FIG. 5, a CDR 202 incorporated in the optical interface unit 200*a* has a pin 204 for applying a bias voltage that is disposed in the middle between terminal resistances 203*a* and 203*b*. The operational amplifier 103 is connected to this pin 204. As a result, the external bias voltage can be applied to the CDR 202 in the same manner as in the first embodiment.

As described above, the optical wavelength division multiplex apparatus 2 of the second embodiment is configured so that the external bias voltage applying circuit is connected to the pin 204 for applying the bias voltage. As a result, without having an additional pin for connection of the external bias voltage applying circuit, the optical wavelength division multiplex apparatus 2 is able to prevent exertion of a negative effect on the CDR 202 even if a pluggable optical device is plugged in by live-line plugging.

In the second embodiment, the CDR 202 is provided with only one pin for applying the bias voltage. A certain type of CDR, however, is provided with two pins for applying the bias voltage, and the external bias voltage applying circuit may be connected to such two pins. In a third embodiment, the external bias voltage applying circuit is connected to two pins for applying the bias voltage, which case will be described.

Figure 6:
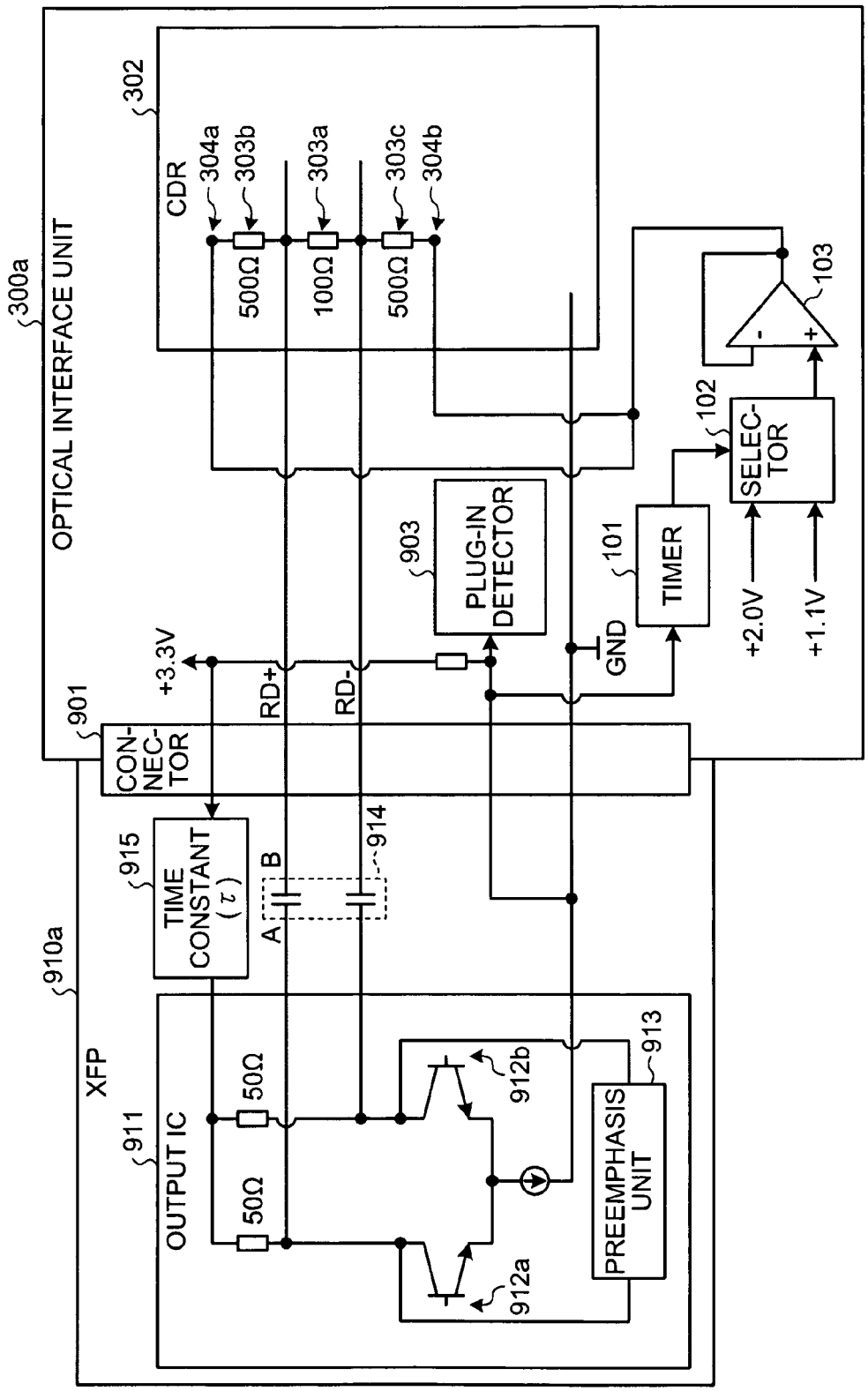
FIG. 6 is an example of a schematic circuit diagram of an optical interface unit incorporated in an optical wavelength division multiplex apparatus according to a third embodiment.

FIG. 6 is an example of a schematic circuit diagram of an optical interface unit 300*a* incorporated in an optical wavelength division multiplex apparatus 3 according to the third embodiment. As shown in FIG. 6, a CDR 302 incorporated in the optical interface unit 300*a* has pins 304*a* and 304*b* for applying the bias voltage that are disposed on both ends of a series of input terminal resistances 303*a* to 303*c*, respectively. The operational amplifier 103 is connected to these pins 304*a* and 304*b*. As a result, the external bias voltage can be applied to the CDR 302 in the same manner as in the first and second embodiments.

As described above, the optical wavelength division multiplex apparatus 3 of the third embodiment is configured so that the external bias voltage applying circuit is connected to the pins 304*a* and 304*b* for applying the bias voltage. As a result, without having an additional pin for connection of the external bias voltage applying circuit, the optical wavelength division multiplex apparatus 3 is able to prevent exertion of a negative effect on the CDR 302 even if a pluggable optical device is plugged in by live-line plugging.

Another aspect of the present invention is achieved effectively when the constituent elements of the optical transmission apparatus disclosed in this application, the described constitution of the optical transmission apparatus, or an arbitrary combination of the constituent elements are applied to a method, an apparatus, a system, a computer program, a recording medium, a data structure, etc.

The optical transmission apparatus disclosed in the present invention offers an effect that a negative effect is not exerted on the CDR even when the optical device is plugged in by live-line plugging.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical transmission apparatus comprising:

a connector into which an optical device transmitting and receiving an optical signal is plugged; and an optical interface device that receives the optical signal via the optical device plugged in the connector, the optical interface device comprising:

a clock data recovery circuit that generates a clock signal for operating the optical interface device;

an internal bias voltage applying unit that applies a given voltage to the clock data recovery circuit;

a plug-in detector that when the optical device is plugged into the connector by live-line plugging, detects live-line plug-in of the optical device; and an external bias voltage applying unit that when the plug-in detector detects live-line plug-in of the optical device, applies a voltage higher than the voltage applied by the internal bias voltage applying unit, to the clock data recovery circuit.

2. The optical transmission apparatus according to claim 1, wherein the optical interface device further includes a time counting unit that counts a time that has passed from a point of detection of live-line plug-in of the optical device by the plug-in detector, and wherein when a passed time counted by the time counting unit exceeds a given time, the external bias voltage applying unit applies a voltage equal in potential to the voltage applied by the internal bias voltage applying unit, to the clock data recovery circuit.

3. The optical transmission apparatus according to claim 1, wherein
the clock data recovery circuit has a pin for applying a voltage, and wherein
the external bias voltage applying unit applies a voltage to the pin to apply the voltage to the clock data recovery circuit.

4. The optical transmission apparatus according to claim 1, wherein
the external bias voltage applying unit applies a voltage to the clock data recovery circuit via an inductance.

5. An optical interface device provided with an optical transmission apparatus for transmitting an input optical signal from an external device to another device, the optical interface device comprising:
a connector into which an optical device transmitting and receiving an optical signal to and from the external device is plugged;
a clock data recovery circuit that generates a clock signal for operating the optical interface device;
an internal bias voltage applying unit that applies a given voltage to the clock data recovery circuit;
a plug-in detector that when the optical device is plugged into the connector by live-line plugging, detects live-line plug-in of the-optical device; and
an external bias voltage applying unit that when the plug-in detector detects live-line plug-in of the optical device, applies a voltage higher than a voltage applied by the internal bias voltage applying unit, to the clock data recovery circuit.

6. The optical interface device according to claim 5, further comprising a time counting unit that counts a time that has passed from a point of detection of live-line plug-in of the optical device by the plug-in detector,
wherein when a passed time counted by the time counting unit exceeds a given time, the external bias voltage applying unit applies a voltage equal in potential to a voltage applied by the internal bias voltage applying unit, to the clock data recovery circuit.

7. An optical transmission method for an optical transmission apparatus that includes a connector into which an optical device transmitting and receiving an optical signal is plugged, and that transmits the optical signal received by the optical device to another device, the optical transmission method comprising:
applying a given voltage to a clock data recovery circuit that generates a clock signal for operating the optical interface device;
when the optical device is plugged into the connector by live-line plugging, detecting live-line plug-in of the optical device; and
when the plug-in detector detects live-line plug-in of the optical device, applying a voltage higher than the given voltage to the clock data recovery circuit.

8. The optical transmission method according to claim 7, further comprising counting a time that has passed from a point of detection of live-line plug-in of the optical device by the detecting,
wherein when the counted time exceeds a given time, a voltage equal in potential to the given voltage is applied to the clock data recovery circuit at the applying the voltage higher than the given voltage.

* * * * *

UNITED STATES PATENT AND TRADEMARK OFFICE
CERTIFICATE OF CORRECTION

| | | |
|---|---|---|
| PATENT NO. | : 8,032,026 B2 | Page 1 of 1 |
| APPLICATION NO. | : 12/320074 | |
| DATED | : October 4, 2011 | |
| INVENTOR(S) | : Tomoko Sato et al. | |

It is certified that error appears in the above-identified patent and that said Letters Patent is hereby corrected as shown below:

IN THE CLAIMS:
Column 11, Line 25, In Claim 5, delete "the-optical" and insert -- the optical --, therefor.

Signed and Sealed this
Thirty-first Day of January, 2012

David J. Kappos
*Director of the United States Patent and Trademark Office*